(No Model.)

W. G. TRETHEWEY & R. H. BRETT.
PIPE OR HOSE COUPLING.

No. 533,150. Patented Jan. 29, 1895.

Witnesses
Inventors
W. G. Trethewey &
R. H. Brett
By James J. Shuhy
Attorney

UNITED STATES PATENT OFFICE.

WILLIAM G. TRETHEWEY AND ROBERT H. BRETT, OF MISSION CITY, CANADA.

PIPE OR HOSE COUPLING.

SPECIFICATION forming part of Letters Patent No. 533,150, dated January 29, 1895.

Application filed March 24, 1894. Serial No. 505,006. (No model.)

*To all whom it may concern:*

Be it known that we, WILLIAM G. TRETHEWEY and ROBERT H. BRETT, citizens of the Dominion of Canada, residing at Mission City, in the county of New Westminster and Province of British Columbia, Canada, have invented certain new and useful Improvements in Pipe or Hose Couplings; and we do declare the following to be a full, clear, and exact description of the invention, such as will enable others skilled in the art to which it appertains to make and use the same.

This invention has relation to an improvement in that class of pipe and hose couplings, known as "detachable couplings," and it has for its prime object to improve such devices by rendering them more effective and easy to operate, at the same time preventing any liability of strain on the joint; the parts being such that the coupling may be adjusted and tightened should the joint become slightly loose caused by long use.

Other objects and advantages will appear from the following description and claim, when taken in connection with the annexed drawings, in which—

Figure 1:
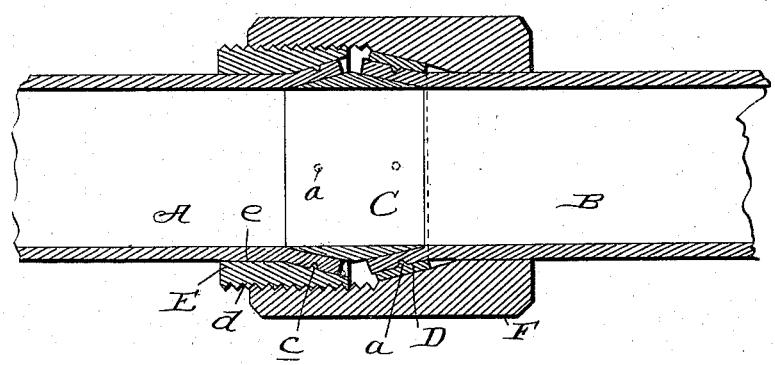
Figure 3:
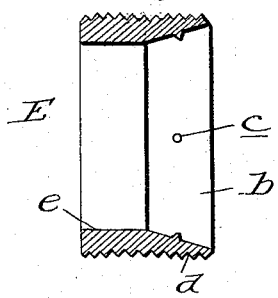
Figure 2:
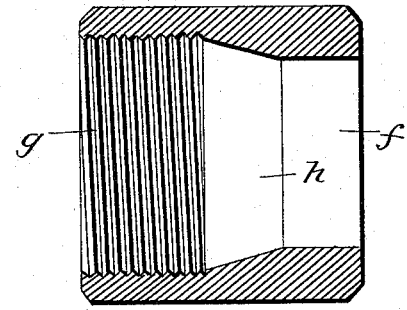
Figure 4:
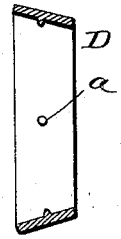
Figure 5:
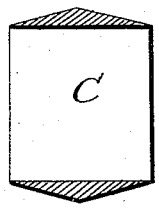

Figure 1, is a longitudinal, sectional view of a portion of two pipes, illustrating our improved coupling. Fig. 2, is a longitudinal, sectional view of the union or coupling thimble removed. Fig. 3, is a similar view of our improved threaded annulus. Fig. 4, is a similar view of our improved flaring ring. Fig. 5, is a similar view of the double conical internal ring.

Referring by letter to said drawings:—A, and B, indicate the adjacent ends of two pipes; the ones here shown being composed of lead, but it is obvious that they may be rubber, canvas, or other suitable material, as the pipes themselves form no part of our invention.

C, indicates the double conical internal ring. This ring which is thickest in its center and tapers therefrom to opposite ends, as shown, is provided with a bore of uniform diameter throughout its length, and is designed to be placed in the adjacent flaring ends of the pipes A, and B, so as to offer no obstruction in the bore thereof.

D, indicates our improved annulus or ring, which has a flaring mouth, as shown, and is provided on its inner side, at intervals in its diameter, with nibs or projections $a$, designed to be forced into the pipe, and the outer side of this ring or annulus, as well as the inside thereof, is designed to present an inclined surface, for a purpose which will presently appear.

E, indicates our improved nut or annulus for the other pipe section. This nut is flared, at one end, as shown at $b$, and in this flared mouth, at intervals in its diameter, are nibs or projections $c$, designed to take into the outer side of the pipe A. This nut is threaded on its outer side as shown at $d$, and is plain or straight on its inner side, for a portion of its length, as shown at $e$.

F, indicates the union or coupling thimble. This thimble is reduced in diameter, and plain at one end, as shown at $f$, to receive the unflared portion of the section B and is increased in diameter and internally threaded at its opposite end, as shown at $g$, and between the plain portion $f$, and the threaded portion $g$, is an intermediate beveled portion $h$.

In operation, when two sections of lead pipe are to be coupled, one end of each section should be flared by the use of a plug, or other implement used for that purpose, and the ring C, placed in these flared ends so as to fit snugly over the conical surfaces of said rings. The annulus or ring D, is then placed over the pipe section B, and the nut or annulus E, placed over the pipe section A. The union or coupling thimble F is then placed over the ring or annulus D, and turned upon the threads of the nut E. As this coupling thimble is turned, the beveled surface $h$, thereof engaging the outer beveled face side of the ring or annulus D, will force the nibs or projections $a$, into the pipe section B, while at the same time, the nibs or projections of the nut E, will be forced into the pipe section A. It will thus be seen that a ring or annulus will be forced and securely held in each section of pipe, while the union or coupling thimble may remain free to be turned. It is obvious that the coupling can be used upon other pipes or tubing, and can be advantageously used upon rubber and canvas hose.

Having described our invention, what we claim is—

The combination with two sections of hose or pipe having their contiguous ends flared; of the double, conical, internal ring C, arranged within the flared ends of the sections and having the bore of uniform diameter throughout its length, the ring or annulus D, flared and surrounding the flared end of one pipe section and having nibs or projections $a$, on its inner side at intervals in its inner surface taking into the said flared end of the pipe section, the nut or annulus E, flared at one end and surrounding the flared and unflared portion of the other pipe section and having the nibs or projections $c$, on the inside of its flared portion at intervals in the inner surface thereof adapted to take into the flared portion of the pipe section which it surrounds and also having its outside threaded, and the union or coupling thimble F, reduced and plain at one end to receive the unflared portion of one pipe section and increased in diameter and internally threaded to receive and engage the nut E, and also having the intermediate inclined portion $h$, surrounding the ring or annulus D, all substantially as and for the purpose set forth.

In testimony whereof we affix our signatures in presence of two witnesses.

WILLIAM G. TRETHEWEY.
ROBERT H. BRETT.

Witnesses:
GORDON E. CORBOULD,
WM. C. MORESLY.